Oct. 26, 1937.　　　K. NÜCHTERLEIN　　　2,096,856
PHOTOGRAPHIC LAMP
Filed Dec. 30, 1935　　　4 Sheets-Sheet 1
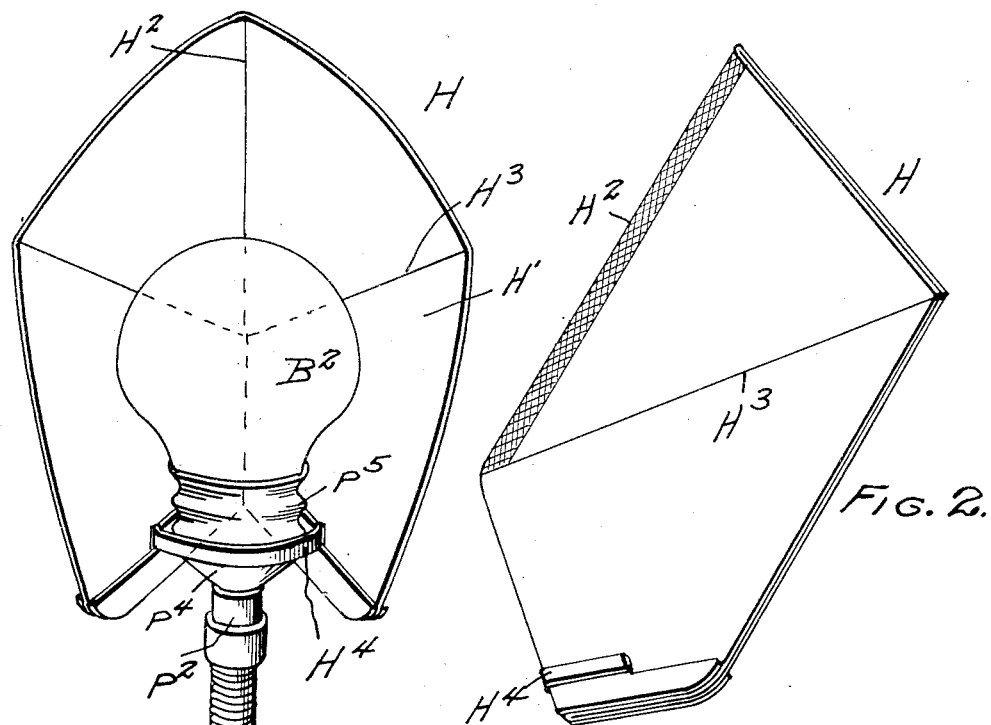
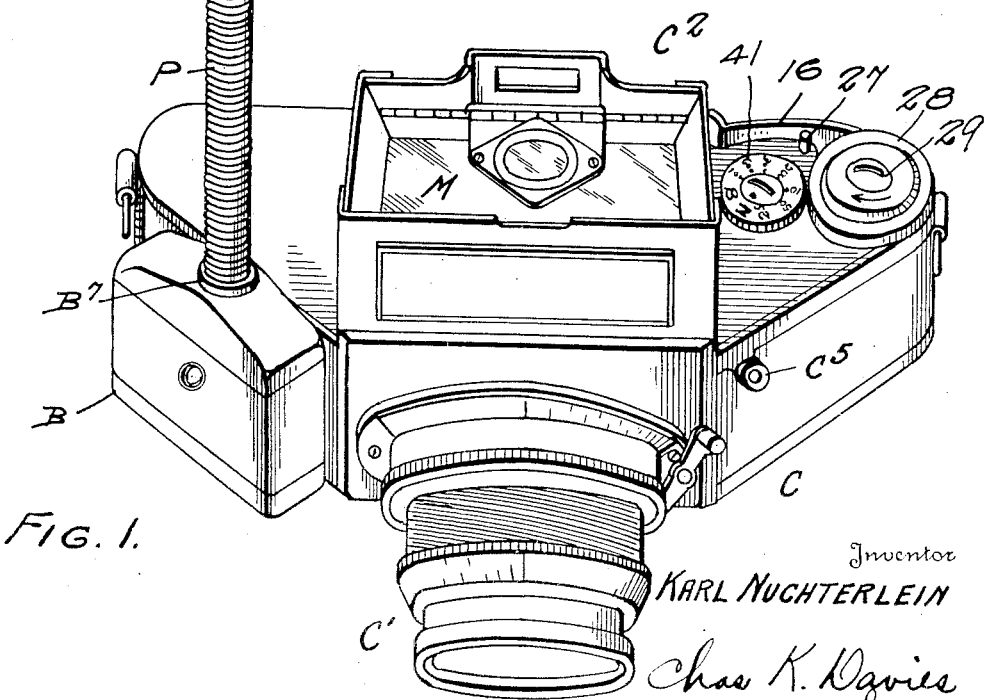
Inventor
KARL NÜCHTERLEIN
Chas K. Davies
& Son
Attorney Oct. 26, 1937.   K. NÜCHTERLEIN   2,096,856
PHOTOGRAPHIC LAMP
Filed Dec. 30, 1935   4 Sheets-Sheet 2
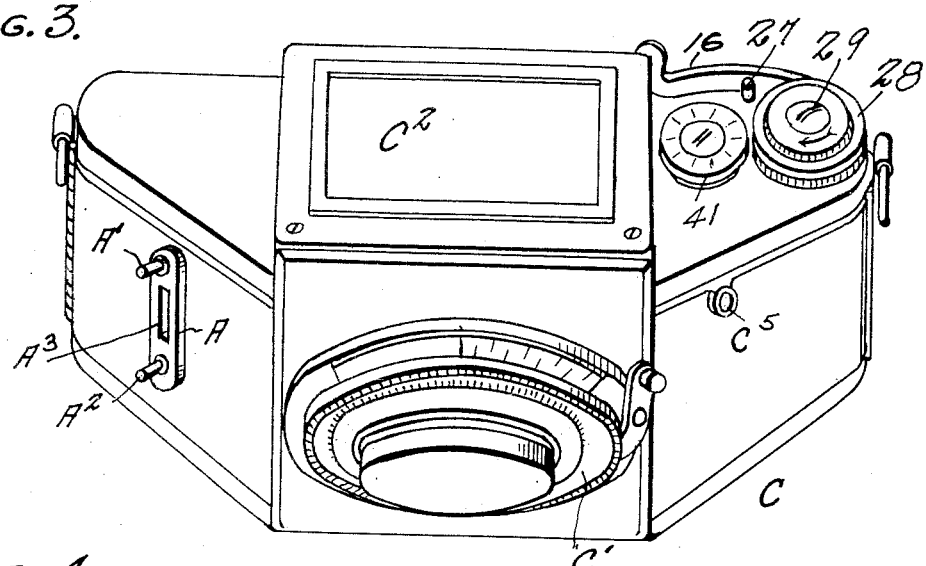
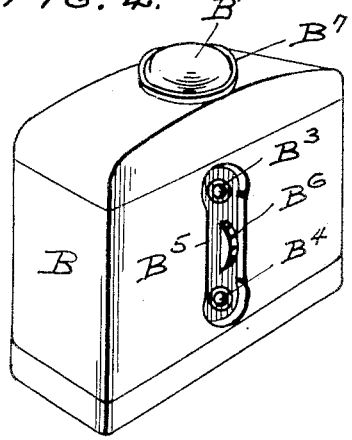
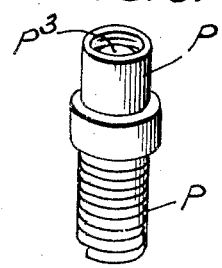
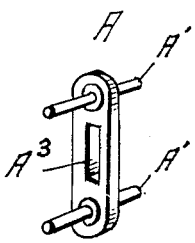
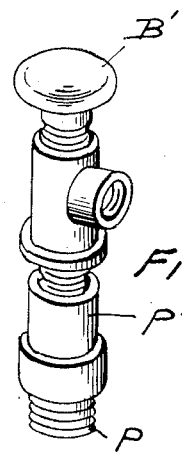
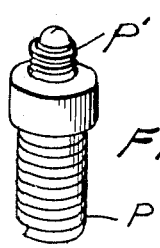
Inventor
KARL NÜCHTERLEIN
By Chas K. Davies + Son
Attorney Oct. 26, 1937.  K. NÜCHTERLEIN  2,096,856
PHOTOGRAPHIC LAMP
Filed Dec. 30, 1935  4 Sheets-Sheet 3

Inventor
KARL NÜCHTERLEIN
By Chas. K. Davis & Son
Attorney

Oct. 26, 1937.  K. NÜCHTERLEIN  2,096,856
PHOTOGRAPHIC LAMP
Filed Dec. 30, 1935  4 Sheets-Sheet 4

Inventor
KARL NÜCHTERLEIN
By Chas. K. Davis & Son
Attorney

Patented Oct. 26, 1937

2,096,856

UNITED STATES PATENT OFFICE 2,096,856

PHOTOGRAPHIC LAMP

Karl Nüchterlein, Dresden, Germany, assignor to Ihagee Kamerawerk-Steenbergen & Company, Dresden, Germany Application December 30, 1935, Serial No. 56,776

4 Claims. (Cl. 240—2)

The present invention relates to improvements in photographic lamps and the invention contemplates the combination with a camera of a lighting attachment which will automatically illuminate the image to be photographed, under control of the means employed for setting the camera. In the present exemplification of the invention, the lighting attachment is combined with a reflex camera which includes a hinged reflecting mirror that may be set in focusing or reflecting position, and which is released from that position and swung to non-reflecting position when the usual "button" is pressed for the purpose of photographing the image. An automatically operating light-switch is controlled by the reflecting mirror, and the light switch is closed to illuminate a lamp when the reflecting mirror moves to non-reflecting position preparatory to taking a picture. The light-switch is automatically opened and the lamp extinguished when the mirror is again returned to focusing or reflecting position.

The invention also involves certain novel features of construction in a lever-operated control device for winding the film, setting the shutter, and controlling the hinged reflecting mirror.

In the accompanying drawings I have illustrated one complete example of the physical embodiment of my invention wherein the parts are combined and arranged according to one mode I have thus far devised for the practical application of the principles of my invention, but it will be understood that changes and alterations are contemplated and may be made in the exemplifying structures within the scope of my claims, without departing from the principles of my invention.

Figure 1 is a perspective view from the front, showing the general assembly and arrangement of parts between the lamp and the camera.

Figure 2 is a perspective view of the shade-reflector, in folded, compact position.

Figure 3 is a perspective view of the camera showing the attaching bracket for the lamp attached to the camera.

Figure 4 is a perspective view of the self-contained, portable, flash light, detached from the camera, and showing its means for connection with the camera and the attaching bracket.

Figure 5 is a perspective view of the detachable bracket employed for fastening the lamp device to the camera.

Figure 6 is an enlarged, detail perspective view of the upper end of the flexible lamp post; and Figure 7 is an inverted, perspective view at the lower end of the flexible lamp post showing its electrical connection or contact for use with the flash light of Figure 4.

Figure 8 is a perspective view at the upper end of the flexible lamp, showing the smaller type of bulb of Figure 4 used in lieu of the large bulb of Figure 1.

In order that the general assembly and arrangement of parts may be readily understood, reference should be had to Figure 1 where the reflex camera as a whole is indicated by the letter C, and provided with a lens mount C', and a foldable or collapsible focusing hood C2, the hood being open, and the camera set for an exposure by pressure against the button C5.

Figure 13:
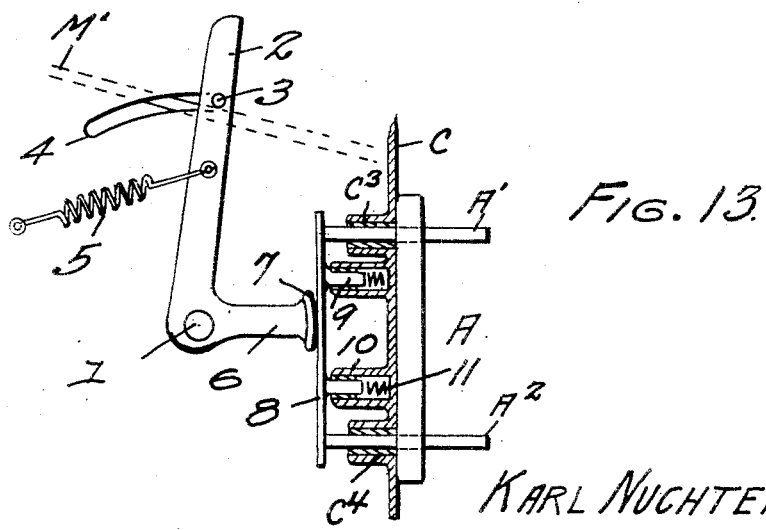
Figure 13 is a detail view, partly in section, of a conventional electrical switch or lamp switch, showing the relation between the switch lever and the movable mirror, the latter being indicated in dotted lines.

As best seen in the detail sectional view of Figure 13, a front wall, preferably the right front wall of the camera, is provided with interior sockets C3 and C4, spaced apart at a convenient distance, and adapted to provide a support for the attaching bracket indicated as a whole by the letter A. The removable or detachable bracket A is preferably a flat plate of non-conducting or insulating material in which two conducting pins A' and A² are fixed, with their ends projecting at opposite sides of the plate, and between these pins the plate is slotted as at A3. As indicated in Figure 5, the bracket is reversible, and it may readily be attached to the camera, as in Figure 3, by inserting the ends of the pins into the sockets C3 and C4 where the pins are retained by frictional engagement with the walls of the sockets. In this position the inner ends of the pins A' and A² project into the interior of a hollow portion of the camera, and the outer portions of the pins project from the front wall of the camera, in position to support a specially constructed, self-contained, portable flash light indicated as a whole by the letter B. For use detached from the camera, this flash-light B has a small bulb or lamp B'. For combined use with the camera, this bulb B' may be used as indicated in Figure 8, and as illustrated in Figure 1, a larger lamp-bulb, as B2, is used to illuminate the image, in each of the three instances the lamp bulb receives its electrical energy from a battery (not shown) but mounted within the housing of the flash light of Figure 4. (See Fig. 14.)

As best seen in Figure 4 the flash-light has a pair of complementary sockets B3 and B4, in one of its walls, which sockets are adapted to slip over the projecting or exterior ends of the pins A' and A² of the bracket, and the wall is also recessed at B5 so that the recess will slip over and cover the plate of the bracket. The switch lever B6 of the flash light, which lever projects into the recess B5 (where it is readily accessible for use when the flash light is detached from the camera) fits into the slot A3 of the bracket.

Figure 14:
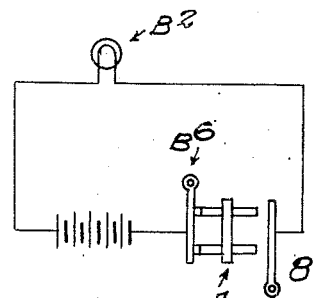
Figure 14 is a diagrammatic view showing the wiring and switches.

Preparatory to employing the flash-light with the camera, the switch B6 of the flash light is closed, as in Figure 14, and then the flash light, as a whole, is attached to the camera and bracket, as in Figure 1. The automatically controlled switch, indicated as a whole by the numeral 8 in Figure 14, is opened by the operation of setting the camera, and it is closed, only when the camera is set for use and after the reflex mirror M' has been swung to focusing position, as will be described.

The small bulb B' screws into a socket B7 in the top of the flash light, for use as in Figure 4, but when the attachment is employed with the camera, this bulb is removed, and a flexible, tubular, or hollow lamp post, indicated as a whole by the letter P is threaded into the socket. At its lower end this tubular, flexible lamp post is provided with a screw head P' forming an electrical contact or connection with the battery connections of the flash light, and this connection is a rigid one, in order that the flexible post may be flexed or bent to desired position in relation to the lens mount of the camera.

At its upper end the post terminates in an interiorly threaded thimble P2 and within the thimble is a centrally located contact P3 similar to P', suitable electrical wiring connecting these two contact points and located within the tubular post.

A detachable socket-head P4 is next threaded into the thimble to make connection with the contact P3, and the enlarged socket P5 of this head is adapted to receive the lamp-bulb B2 as indicated in Figure 1.

The illumined lamp-bulb B2, of course, provides the illumination, or light for the exposure, and in connection with the bulb I utilize a combination shade-reflector for directing the light rays where desired, and for shading the lamp for the convenience of the photographer. This shade-reflector is in the nature of a removable hood, indicated as a whole by the letter H, and is fashioned of light but strong material for mounting at the top of the lamp post and for enclosing the rear part of the lamp bulb as well as the top part of the bulb. One face of the hood, as H', is fashioned as a reflector surface for enclosing or partially enclosing the bulb and for reflecting the light rays therefrom, in front of the camera, and upon the image to be photographed. The hood is fashioned of two flat sections of material, such as card-board, and these sections are hinged together with a fabric-binding or strip H2 that provides for a longitudinal fold in the hood, and for flexing or bending of the hood when mounted on the lamp post. In addition, two or more scores or kerfs H3 are fashioned in the hood sections to facilitate bending or flexing of the hood about the bulb, and finally, the hood is fashioned with an elastic retaining band H4 having its ends attached at the outer side of the hood and with the body of the band extending across the inner portion of the folded hood. As indicated in Figure 1, this elastic band is snapped over the bulb and placed around the upper part of the socket head P4, and the elasticity of the band holds the hood in close relationship around and over the desired portions of the lamp bulb, for shading, as well as for light-reflecting purposes.

In Figure 1 the lighting attachment is shown with the post in upright position with the shade-reflector throwing or reflecting the light rays straight ahead, but it will be understood that the flexible lamp post with its fixed base at B7, may be turned or swung to various angles, and that the shade-reflector may also be adjusted, with the lamp bulb as a center, to various desired positions for the convenience of the photographer.

When the shade-reflector is not in use, it is folded to the compact, flat, shape of Figure 2, and packed or stored in a suitable place, as are also the other detachable and removable elements or devices of the lighting attachment.

As before stated, the lamp is illumined by energy from the battery in the flash-light, and the current from the battery is controlled through movement of the reflecting mirror M' of the camera. The mirror M' controls a lighting switch that is located within the walls of the camera, and this switch comprises the two conductor pins A' and A² of the attaching bracket. It will be understood that any suitable arrangement may be made for this automatically controlled lamp switch, which is indicated as a whole by the numeral 8 in the diagram Figure 14.

Figure 12:
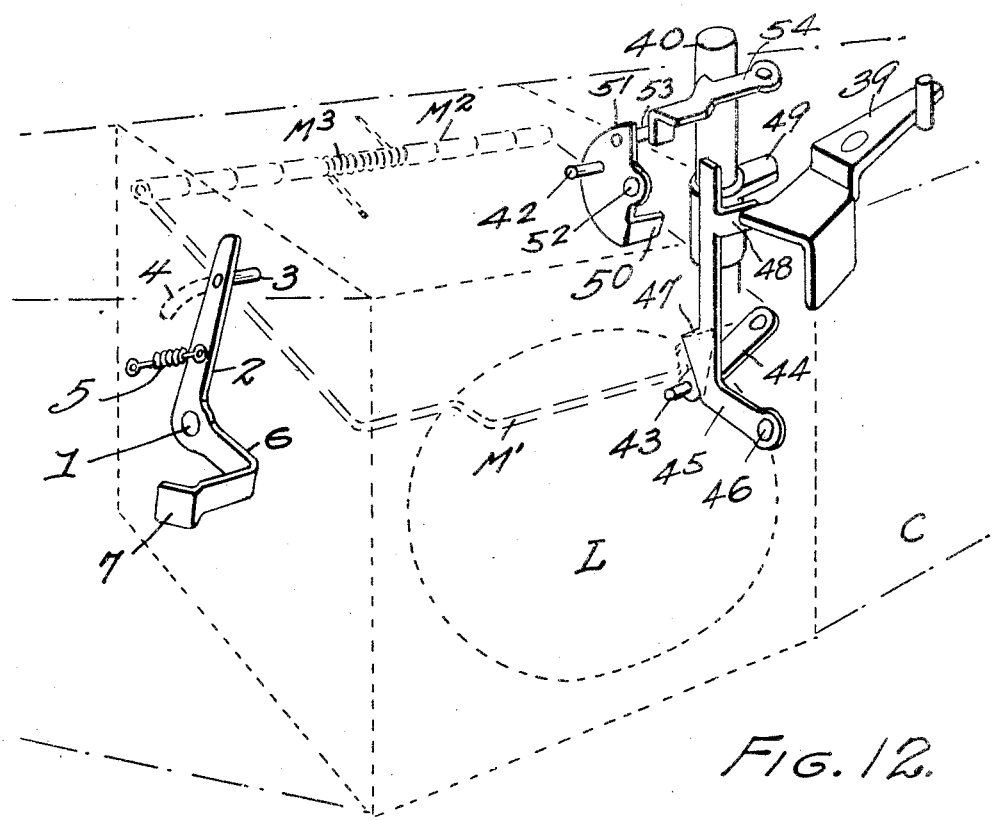
Figure 12 is a perspective view in diagrammatic form showing the mechanical connections for transmission of movements from the mirror-control device, through the movable mirror to the control devices of the electric lamp.

In the conventional form of the switch indicated in Figure 13, as well as in Figure 12 I utilize a switch lever that is pivoted at 1 on the outer side of a wall of the light chamber indicated as L in the drawings, and this lever is located in a space of the camera, back of the attached flash-light of Figure 1. The lever is fashioned with an upper arm 2, and a laterally extending pin 3 near the free end of the lever projects through an arcuate slot 4 in the side wall of the light chamber L in position to engage on top of the mirror M'.

The mirror M', it will be understood is located below the fixed ground glass plate M of the camera, and the mirror M' is hinged at M2 in the back or rear upper portion of the light chamber L. A spring M3 of the mirror, when permitted to do so, snaps the mirror from lowered position, to the upper position in which it is shown in the drawings, and in this upper position the film is exposed, through the open light chamber L, for the taking of a picture.

Thus, the hinged, spring actuated mirror, when in position for an exposure, and through the use of the pin 3, holds the lever arm 2 in position shown in Figures 12 and 13 and in this position the automatic switch is closed, and the lamp bulb B2 is illumined.

The mirror M' is swung from focusing or reflecting position, to the non-reflecting position of Figures 9, 10, 12 and 13, by the spring M3, and when the mirror is in this position it holds the switch lever in closed position. When the mirror M' is swung to focusing position or reflecting position, the switch lever through retaining pin 3 is released by the swinging mirror, and a spring, as 5 pulls the arm 2 of the lever to the rear, the pin 3 moving in the arcuate slot 4 in the side wall of the light chamber L. As the mirror is swung to non-reflecting position, to open the chamber L to the light, the upward swing of the mirror, through the pin 3 swings the switch lever to close the lamp switch and illumine the lamp.

The switch lever is fashioned with an angular arm 6, and this arm terminates in a cam-head 7 which is in position to swing into frictional contact with a horizontally movable, spring pressed switch plate 8, and this plate, as indicated in Figure 13 is thereby held in contact with the inner ends of the conductor pins A' and A² of the attaching bracket. The contact plate 8 is supported by a pair of spaced pins 9, 9, in insulated sockets 10 mounted at the inner side of the front wall of the camera, and springs, indicated at 11, tend to disengage the plate from the ends of the pins A' and A². Thus, when the swinging mirror M' swings arm 2 forwardly and upwardly, the arm 6 and head 7 swing downwardly and forwardly, and the head pushes the plate 8 into electrical and frictional contact with the ends of the conductor pins A' against the tension of springs 11. Conversely, when the mirror swings down to reflecting position and releases lever 2, the spring 5 swings arm 2 downwardly to the rear and thereby swings arm 6 and head 7 upwardly and to the rear, thus permitting springs 11 to open the lamp switch, and extinguish the lamp.

Figure 9:
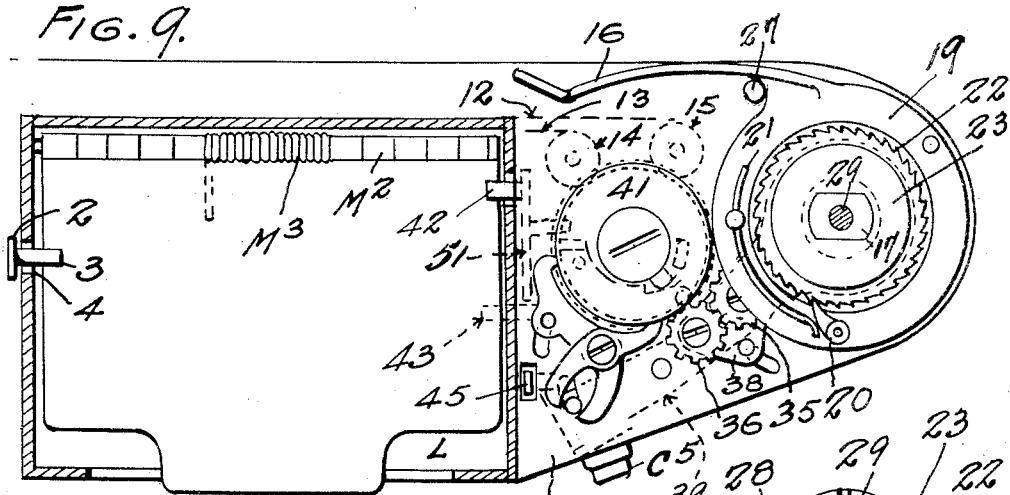
Figure 9 is a top plan view of a portion of the reflex camera showing the movable mirror and indicating lamp or light control means actuated thereby, together with the means for actuating the mirror which controls the light, some parts being shown in section and other parts in dotted lines.
Figure 10:
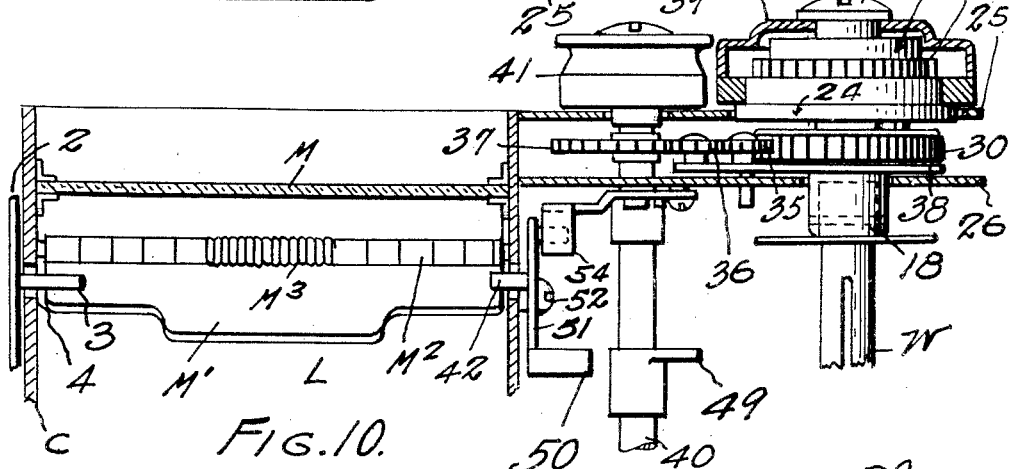
Figure 10 is a fragmentary view of the camera showing operating parts in elevation, showing the movable reflex camera in uplifted or exposure position, in which position the mirror retains the electrical control parts in position for illumination.
Figure 11:
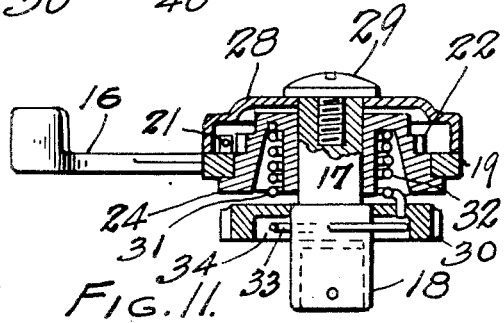
Figure 11 is a detail sectional view of the lever-operated mechanism for winding and setting the parts of the camera.

In Figures 9, 10, and 11, particularly, I have shown the operating mechanism of the camera by means of which the opening and closing of the lamp switch are automatically controlled through the movement of the hinged mirror M'.

Exposures may be made by applying pressure at C5, either by direct manual pressure, or by use of a pneumatic device or bulb, as usual.

It will be understood that the film, not shown, is to be wound upon the winding roll or spool W, and the film is passed across the rear of the light chamber L with its sensitized surface transversely of the optical axis of the camera.

The shutter comprises two curtains indicated as 12 and 13 that are automatically wound upon spring-rollers indicated at 14 and 15 in Figure 9. These curtains are designed to flash across the rear of the light chamber L and they move in a direction opposite to that of the feed of the film when the latter is being wound upon its spool or roll W. The winding of the film, the winding of the curtains of the shutters, and the movement of the mirror M' from non-reflecting position to focusing position or reflecting position, are accomplished through the swinging of a manually operated lever 16, which is mounted to swing at the rear of the camera on a short shaft 17, which shaft terminates in a socket-head 18 that receives the usual pin of the winding spool W for the film.

This operating lever is fashioned with an integral bearing ring 19, upon which is mounted a pivoted pawl 20, and a wire spring 21, mounted at one end on the ring, bears at its other, free end against the pawl to hold it in engagement with a ratchet 22 that is fashioned on the exterior of a circular, rotary head 23.

As best seen in Figure 9, the upper end of the shaft 17 is flattened, and inserted in a complementary, central socket or opening in the head so that the shaft will rotate with the head when the latter is turned in the direction of the arrow in Figure 3 to wind the film, set the shutters or curtains, and to swing the mirror M' to focusing position in line with the optical axis of the camera.

The rotary ring 19 of the operating lever encircles the head 23 and the ring rests upon an annular flange 24 at the base of the ratchet head or driving head, and these rotating parts, as a unitary driving head, are supported in a pair of spaced parallel frame plates 25 and 26 of the camera.

A stop pin 27 is mounted on the top of the plate 25 to limit the inward or idle stroke of the lever, and it will be understood that two or three outward working strokes of the lever, through engagement of the pawl and ratchet, will rotate the shaft and its head for the desired purpose.

As a shield or protector, a round cap 28 is fitted over the rotary head, and retained thereon by means of a screw 29, and of course this cap revolves with the head and shaft when they are turned by the working strokes of the lever.

Shaft 17 is also provided with a driving gear 30, mounted loosely thereon beneath the driving head, and this gear is resiliently coupled with the rotary drive head through the use of a coiled spring 31 which is nested in an annular recess 32 extending upwardly from the lower face of the head. One end of this spring is attached to the head and the other other end of the spring is attached to the drive gear, so that in the winding operation for the film spool and for setting the camera, this movement may be accomplished smoothly, without jars and strains. In addition to the resilient coupling, a frictional clutch is also illustrated in Figure 11 between gear shaft 17 and the gear 30, which clutch acts as a brake for stabilizing the movement of the gear. This friction clutch includes an annular spring wire 33, one end of which is passed through and secured in a transverse hole in the shaft, and the free portion of the wire spring extends substantially around the shaft, in frictional contact with the circular wall of a recess 34 that is fashioned in the under face of the drive ring or gear 30.

From this description it will be understood that by operating the lever 16 the film feeding mechanism is rotated to wind the film for its initial start on the spool W, and after each exposure the film is of course wound on the spool.

In addition to the film winding operations, the gear 30 transmits power through a train of smaller gears 35 and 36 to a larger gear wheel 37, and this gear wheel 37 winds the shutter mechanism in connection with the rollers 14 and 15 for the two curtains.

The small gears 35, and 36 are mounted on an oscillatable gear plate 38 which is located above the frame plate 26, and the plate has an anchoring ring concentric with the drive shaft, and also a pin depending through a slot in the frame plate.

A release lever 39 (Figure 12) pivoted beneath the frame plate 26 bears against this pin of the gear plate, and when the photographer releases the camera to make an exposure by pressure on the button C5, this action disengages gear 36 from gear 37. Gear 37 is mounted on a gear shaft 40, upon the outer or upper end of which shaft is also mounted the dial ring or disk 41 used in setting the time exposure for the camera.

When the button C5 is pressed to actuate the lever 39, the swinging movement of this lever releases the hinged mirror M' so that it may automatically swing from focusing position to the non-reflecting position, in which latter position the lamp B2 is illuminated.

In Figures 9, 10, and 12 it will be seen that a pin 42 projects through a slot in one of the side walls of the light chamber L and this pin bears against the top surface of the hinged mirror M' for the purpose of swinging the mirror from non-reflecting position to the reflecting or focusing position. Another pin, or detent, 43 also projects through a slot, in the wall of the light chamber, below pin 42, to retain the mirror in focusing position. This pin 42 and the detent 43 are located in position to engage the edge of the mirror opposite to the edge that contacts with the pin 3 of the electric switch device for the lamp B2.

The detent 43 is mounted on a cam springblade 44 fixed at one end to the light-chamber wall, but exterior of the chamber, and this spring blade is flexed away from the wall to withdraw the detent from the edge of the mirror, thereby permitting the upward swing of the mirror from reflecting position to non-reflecting position. For flexing the spring blade and releasing the mirror I employ a cam lever 45, which is pivoted at 46 to the chamber wall, and this lever is fashioned with a cam face 47 in frictional contact with the spring blade. At its upper end the cam lever has a laterally projecting lug 48 against which the lever 39 bears, and the swinging movement of the lever 39 swings the cam lever, thereby flexing the spring blade 44 to withdraw the detent 43 and release the mirror.

The mirror M' is lowered or swung on its hinge to focusing position through the operation of the rotary shaft 40, which has a lug 49 mounted thereon that turns in a circular path with the shaft and contacts with a lug 50 located in the path of movement of the rotating lug 49. Lug 50 is carried by a rotary plate 51, which is pivoted at 52 on the outer side of the light-chamber wall, and the pin 42 is also carried by this rotary plate. Thus, as the lever 16 is swung on its working stroke the rotary plate is turned, and through the instrumentality of the pin 42 the mirror is swung to focusing position, and it is there held by co-action of a pin 53 on the rotary plate and a locking lever 54, which elements are released in suitable manner preparatory to withdrawing the mirror from focusing position.

While I have shown specific details of construction for transmitting motion from the working stroke of the lever 16 to the mirror M' for the purpose of swinging the mirror on its hinge, and other details of construction for winding the film, releasing the shutter, and releasing the mirror, it will be understood that this showing is one exemplification for control of the mirror, which mirror controls the light switch. It will also be understood that the specific details of the light switch, which switch is under control of the mirror, show one exemplification only of the switch arrangement. These details of construction, and other details of construction may be changed within the scope of my appended claims without departing from the spirit of my invention.

Having thus fully described my invention, what I claim as new and desire to secure by Letters Patent is:—

1. The combination with a camera having a pair of spaced sockets, and operating means for the camera, of an attaching bracket comprising spaced conductor pins seated in said sockets, a portable self-contained electric lighting device also having sockets fitted over said pins, a movable contact element within the camera adapted to co-act with the pins as a lighting switch, and mechanically operated means within the camera actuated by the camera operating means to close said switch.

2. The combination with a camera having a pair of spaced sockets, and operating means for the camera, of an attaching bracket comprising spaced conductor pins seated in said sockets, a portable self-contained electric lighting device also having sockets fitted over said pins, a lamp post mounted on the device and a lamp on the post, a movable contact element within the camera and mechanically operated means within the camera actuated by the camera operated means for electrically contacting said elements with said pins to cause illumination of the lamp.

3. The combination with a reflex camera having a pair of spaced sockets and said camera including film feeding mechanism and operating means therefor, a hinged mirror, means in coaction with said operating means for swinging the mirror into focusing position, and means for swinging the mirror into non-focusing position, of a portable self-contained electric lighting device also having a pair of spaced sockets and including a lamp, an intermediate bracket having conductor pins seated in said two pairs of sockets, a movable contact element within the camera, and means co-acting with the means for swinging the mirror to non-focusing position whereby said element is moved to electrically contact with the pins to cause illumination of the lamp.

4. In a lighting attachment for a camera, the combination of detachable supporting means mounted on the camera and forming one set of contacts for an electric lighting switch located within the camera, and a detachable, portable, self-contained electric lighting device mounted on the supporting means and electrically connected therewith.

KARL NÜCHTERLEIN.